(12) United States Patent
Hayashi

(10) Patent No.: US 8,111,592 B2
(45) Date of Patent: Feb. 7, 2012

(54) OPTICAL PICKUP

(75) Inventor: Sotaro Hayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 621 days.

(21) Appl. No.: 12/285,981

(22) Filed: Oct. 17, 2008

(65) Prior Publication Data

US 2009/0109829 A1    Apr. 30, 2009

(30) Foreign Application Priority Data

Oct. 25, 2007    (JP) ................................. 2007-277302

(51) Int. Cl.
*G11B 7/135* (2006.01)
(52) U.S. Cl. ................................. 369/44.14; 369/112.23
(58) Field of Classification Search ............. 369/112.23, 369/44.14, 44.22; 359/719
See application file for complete search history.

(56) References Cited

U.S. PATENT DOCUMENTS

| | | | | |
|---|---|---|---|---|
| 6,781,946 | B2 * | 8/2004 | Murata et al. | 369/112.23 |
| 6,999,401 | B2 * | 2/2006 | Tanaka | 369/112.23 |
| 2005/0276207 | A1 * | 12/2005 | Oka et al. | 369/112.23 |
| 2007/0014205 | A1 * | 1/2007 | Inui | 369/44.14 |

FOREIGN PATENT DOCUMENTS

| | | |
|---|---|---|
| JP | 2001-209956 | 8/2001 |
| JP | 2002-222535 | 8/2002 |
| JP | 2003-242703 | 8/2003 |
| JP | 2006-120246 | 5/2006 |
| JP | 2006-338783 | 12/2006 |

* cited by examiner

*Primary Examiner* — Peter Vincent Agustin
(74) *Attorney, Agent, or Firm* — Morgan, Lewis & Bockius LLP

(57) ABSTRACT

An optical pickup is provided with a protector which prevents collision between an objective lens and an optical recording medium. The protector includes: a first sheet material which is arranged on an uppermost layer, has durability for abrasion against the collision with the optical recording medium that rotates in high speed, and is softer than a protecting member that protects a recording surface of the optical recording medium; a second sheet material which is provided in lower side than the first sheet material and has elasticity; and a plurality of adhesive sheets to perform adhesion between the sheet materials that form the protector, or adhesion between the lowermost sheet material among the sheet materials and a lens holder which holds the objective lens, or the objective lens.

15 Claims, 3 Drawing Sheets

TRACKING DIRECTION

FOCUSING DIRECTION

OPTICAL PICKUP

This application is based on Japanese Patent Application No. 2007-277302 filed on Oct. 25, 2007, and the contents of which are hereby incorporated by reference.

BACKGROUND OF THE INVENTION

1. Field of the Invention

The present invention relates to an optical pickup which makes it possible for information recorded in an optical recording medium to be read out and information to be recorded on an optical recording medium by irradiating light on the optical recording medium. In particular, the present invention relates to structure to prevent collision between an objective lens which is provided with the optical pickup and the optical recording medium.

2. Description of Related Art

Optical recording media such as a compact disc (hereinafter referred to as a CD) and a digital versatile disc (hereinafter referred to as a DVD) are widely available. In addition, researches on an optical recording medium which can be performed recording of information in high density are being carried on in recent years in order to further increase recording capacity of the optical recording medium. For example, a high density optical recording medium such as an HD-DVD or a Blu Ray Disc (hereinafter referred to as a BD) has been available in the market.

For a case to reproduce information from such optical recording medium or for a case to record information on the optical recording medium, an optical pickup which includes a light source, an objective lens that makes light emitted from the light source focus on a recording layer of the optical recording medium, and a photo receiving element that receives reflection light reflected by the recording layer, is used.

In the optical pickup it is necessary to control a focusing position of the objective lens such that focus of light which is emitted from the light source is always matched on the recording surface of the optical recording medium irrespective of waving of surface of the optical recording medium or the like when reading out or recording of information is performed. For this purpose, structure is employed in that control is performed such that a position of the objective lens which is held by a lens holder is moved by an optical lens actuator in order to make distance between the objective lens and the optical recording medium always constant. In below described explanation, there may be a case where such control is referred to as a focus servo.

By the way, when information recorded on an optical recording medium that can be performed the above described high density recording, for example, a BD, is read out by the optical pickup, for example, it is necessary that spot size of light spot which is formed on the optical recording medium is made small. As for method to make spot size of the light spot small, it is usually performed to make wavelength of light which is emitted from the light source shorter and at the same time to make numerical aperture of the objective lens larger.

However, if the numerical aperture of the objective lens is made larger, space between tip of the objective lens and the optical recording medium (working distance; WD) becomes narrower when the optical pickup is operated. Tendency for this WD to become narrower is remarkable especially in the optical pickup which can be applied to the BD, for example. As the WD becomes narrower as above described, possibility of occurrence of the collision between the objective lens and the optical recording medium is made much higher, for example, when the optical recording medium in that waving of its surface is large, is used or when the focus servo becomes out of control, or the like due to scratch that is made on surface of the optical recording medium, vibration from outside, or the like.

It should be noted that the situation where the WD becomes narrower is not limited only to the optical pickup which can be applied to the BD, and there may be a case where it happens in the optical pickup which is applied to the optical recording medium such as a CD or a DVD, for example. That is, as for a note type personal computer or the like, because it is requested that it is made thinner, the objective lens which is provided in the optical pickup, has a small diameter lens. In such case, too, the WD becomes narrower. Therefore, in such case, too, possibility of occurrence of the collision between the objective lens and the optical recording medium becomes very high.

Because of these reasons, in order to avoid that information recorded on the optical recording medium may become non-readable, or the optical pickup may become non usable because of damage to the objective lens, by the collision between the objective lens and the optical recording medium, various structures are proposed conventionally in which a protector for prevention of the collision is provided. It should be noted that, as for the protector for prevention of the collision, it is required that the protector is hard to damage the optical recording medium and hard to be worn out in itself when the collision with the optical recording medium happens. It is because to prevent deterioration of reproduced signal caused by alteration of state of the optical recording medium.

As for structure of the protector for prevention of the collision that has been conventionally proposed, there is structure in which a protector that is composed by a molded article is provided on a lens holder to hold the objective lens. For example, see JP-A-2006-120246, or JP-A-2001-209956. As for another structure of the protector for prevention of the collision, there is structure in which a coating layer is provided on outer layer of a protecting portion to prevent the collision between the objective lens and the optical recording medium. For example, see JP-A-2003-242703, JP-A-2006-338783, or JP-A-2002-222535. It should be noted that, in this case, examples are shown in which the protector for prevention of the collision is attached on a lens holder, and in which the protector for prevention of the collision is attached on the objective lens.

However, in case of the structure in which the protector composed by the molded article is provided on the lens holder, it causes a problem that it cannot sufficiently restrain damage on the optical recording medium or stain by abrasion of the protector by only using merely the molded article such as polyacetal or the like that is plastic softer than the optical disc.

In this regard, in JP-A-2006-120246, it is intended to solve the above described problem by means that utilizing the molded article composed of silicon rubber composite in which compounding agent that contains at least one of polyurethane particle and fluorine contained resin powder is mixed, as the protector. However, in case of the structure disclosed in JP-A-2006-120246, it causes problem in cost because it is the structure in that the molded article is formed utilizing a specially compounded composition.

Further, as the structure for the protector which is provided on the lens holder, in case where a portion that has a curved surface is formed as disclosed in JP-A-2001-209956, it causes a problem that a load for working operation increases when the optical pickup is manufactured because dimensional control for it is not easy.

Further, in case where structure is employed in which the coating layer that has special composition is provided on the protector portion as disclosed in JP-A-2003-242703, JP-A-2006-338783, or JP-A-2002-222535, though it has a merit that it is good at tolerance at height, it causes a problem that cost for it increases.

SUMMARY OF THE INVENTION

In view of the above described problems, it is an object of the present invention to provide an optical pickup in which a protector to prevent collision between an objective lens and an optical recording medium is included, and which can reduce occurrence of scratch or stain on the optical recording medium caused by the collision with the protector, and for which the protector can be formed in low cost and in low load for working operation.

To attain the above described object, an optical pickup in accordance with the present invention includes: a light source; an objective lens which focuses light that is emitted from the light source on a recording surface of an optical recording medium; a lens holder which holds the objective lens; and a protector which is formed on the lens holder or the objective lens to prevent collision between the objective lens and the optical recording medium. The optical pickup is characterized by that the protector includes: a first sheet material which is arranged on an uppermost layer, has durability for abrasion against the collision with the optical recording medium that rotates in high speed, and is softer than a protecting member that protects the recording surface of the optical recording medium; a second sheet material which is provided in lower side than the first sheet material and has elasticity; and a plurality of adhesive sheets to perform adhesion between the sheet materials that form the protector, or adhesion between the lowermost sheet material among the sheet materials and the lens holder, or the objective lens.

By this arrangement, the structure for a protector which has possibility to collide with an optical recording medium is provided with a first sheet material which has durability for abrasion against the collision with the optical recording medium that rotates in high speed, and which is softer than a protecting member to protect a recording surface of the optical recording medium, and which is arranged on a portion that has possibility to contact directly with the optical recording medium. Further, in the structure a second sheet material which has elasticity, is arranged in lower side than the first sheet material. As a result, scratch or stain is hard to be generated on the optical recording medium even when the optical recording medium and the protector collide with each other because the second sheet material which has elasticity plays a role to alleviate impact force at the collision in addition to material characteristic of the first sheet material.

Further dimensional control is easy to perform because the protector that brings out the effect such as described above, is formed by laminating a plurality of sheets. Still further, it becomes possible to form the protector in low cost because there is no need to use coating layer which has a special composition.

Further, it is no problem in the present invention that the protector is formed of the first sheet material, the adhesive sheet, the second sheet material, and the adhesive sheet in this order from upper layer to lower layer in the optical pickup which is structured as above described. By this arrangement, because minimum numbers of the sheet materials are used to form the protector, the cost becomes low and the dimensional control is performed easily.

Still further, it is preferable in the present invention that the first sheet material is made of any one of polyester filament, ultra high molecular weight polyethylene, and polyacetal in the optical pickup which is structured as above described.

Still further, it is preferable in the present invention that the second sheet material is made of urethane resin in the optical pickup which is structured as above described.

Further, it is no problem in the present invention that even numbers of the protectors are formed on the lens holder, and each protector is arranged such that each protector has substantially symmetrical positional relation with one of the protectors with regard to a center line which is substantially parallel to an optical axis direction of the objective lens and passes substantially center of the lens holder in the optical pickup which is structured as above described.

By this arrangement, size of the protector can be made larger and load for working operation can be reduced because it has structure in that the protector is provided on the lens holder. Further, possibility of the collision between the optical disc and the objective lens can be reduced because even numbers of the protectors are provided, and each protector is arranged such that each protector has substantially symmetrical positional relation with one of the protectors with regard to a center line which passes substantially center of the lens holder.

SUMMING UP OF EFFECTS OF THE PRESENT INVENTION

By the optical pickup which includes a protector that prevents collision between an objective lens and an optical recording medium, below described effects can be obtained:

(1) it is possible to reduce generation of the scratch or the stain in comparison with conventional technology even when the protector and the optical recording medium collide with each other, and (2) it is possible to form the protector that is included in the optical pickup, in low cost and low load for working operation.

DETAILED DESCRIPTION OF THE PREFERRED EMBODIMENTS

Hereinafter embodiment of the optical pickup in accordance with the present invention will be explained in detail with reference to the drawings.

Figure 1:
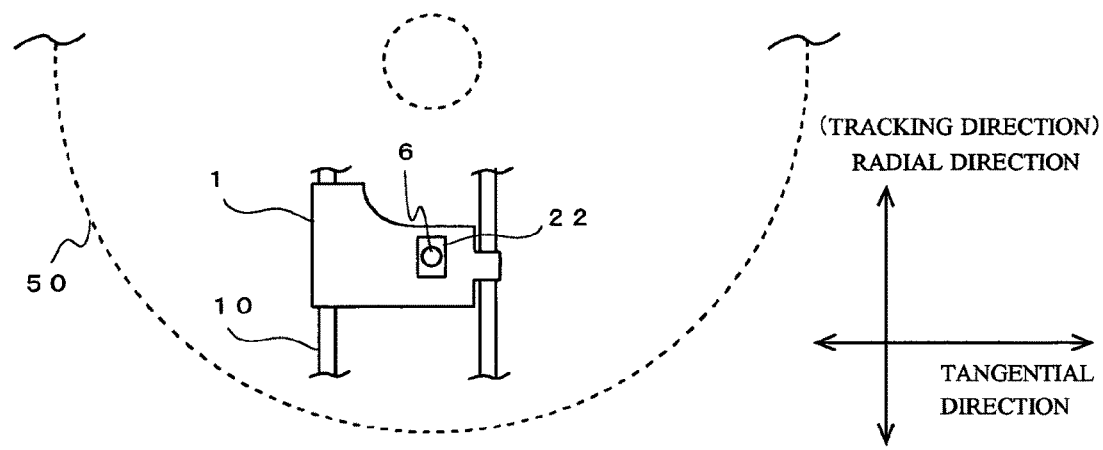
FIG. 1 is a schematic plan view to show structure of an optical pickup according to the present embodiment.
Figure 2:
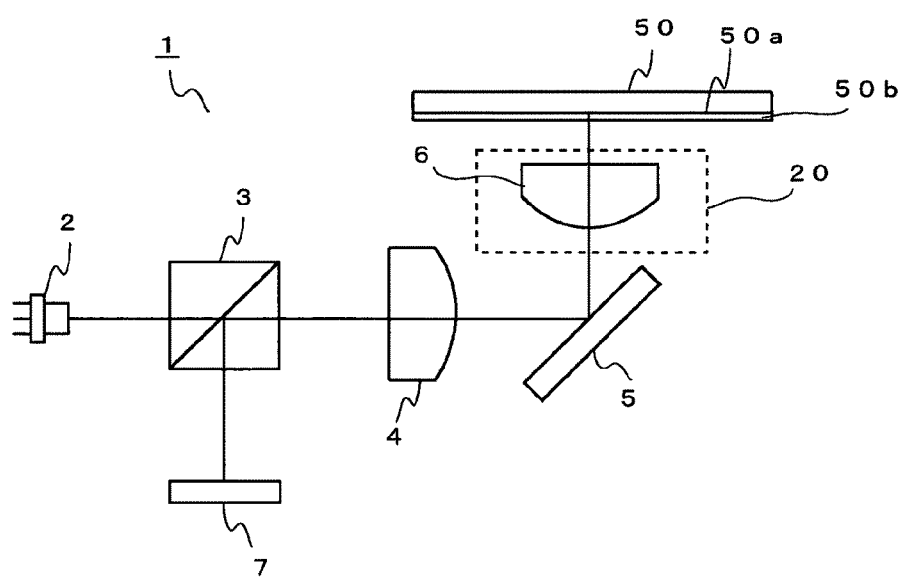
FIG. 2 is a schematic diagram to show structure of an optical system for the optical pickup according to the present embodiment.

FIG. 1 is a schematic plan view to show structure of an optical pickup according to the present embodiment. Further, FIG. 2 is a schematic diagram to show structure of an optical system for the optical pickup according to the present embodiment. It should be noted that, an optical disc (optical recording medium) 50 which is shown by dotted line in FIG. 1, exists above the optical pickup 1.

The optical pickup 1 is a device which makes it possible to perform reading out of information that is recorded on the optical disc 50, or writing of information in the optical disc 50 by irradiating laser light onto the optical disc 50. As shown in FIG. 1, the optical pickup 1 is supported in slidable manner by two guide rails 10 which extend in a parallel direction with a radial direction of the optical disc 50 and are arranged parallelly with each other in a prescribed distance. Though detailed explanation about structure in which the optical pickup 1 is moved in the radial direction, is omitted because the structure is well known, it may be a driving mechanism that is formed by combination of a motor, a rack, and a pinion (all not shown), for example.

It should be noted that the optical disc 50 from which reading out of information or to which writing of information is performed by the optical pickup 1, is rotated in high speed when reading out of information or the like is performed. This rotation is performed by a spindle motor which is not shown in the drawing.

As shown in FIG. 2, in the optical system of the optical pickup 1, a semiconductor laser 2, a beam splitter 3, a collimator lens 4, a standup mirror 5, an objective lens 6, and a photo detector 7 are included. It should be noted that, it is of course no problem that other optical members, for example, such as a diffraction element which makes the light emitted from the semiconductor laser 2 split into three beams, or a wave aberration correction element which performs correction of wave aberration such as spherical aberration, coma aberration, and the like, may be arranged at an appropriate position in the optical pickup 1 depending on their necessity.

The semiconductor laser 2 emits laser light which has a prescribed wavelength. The wavelength of the laser light which is emitted from the semiconductor laser 2, is decided depending on a kind of the optical disc 50 that is a target of the optical pickup 1 (for which reading out or writing on of information is performed). That is, if the optical pickup 1 is a device which corresponds to the BD, for example, it is structured such that the laser light having the wavelength of 405 nm band is emitted from the semiconductor laser 2. In similar ways, if the optical pickup 1 is a device which corresponds to the DVD, it is structured such that the laser light having the wavelength of 650 nm band is emitted from the semiconductor laser 2, or if the optical pickup 1 is a device which corresponds to the CD, it is structured such that laser light having the wavelength of 780 nm band is emitted from the semiconductor laser 2.

The beam splitter 3 has a function to pass through the laser light emitted from the semiconductor laser 2, for leading the laser light to the optical disc 50, and to reflect returned light from the optical disc 50 (laser light reflected by the optical disc 50) for leading it to the photo detector 7. The laser light that is emitted from the semiconductor laser 2 and passes through the beam splitter 3 is converted into parallel light by the collimator lens 4, is reflected by the upstand mirror 5 in order to have direction substantially perpendicular to a disc surface of the optical disc 50. The laser light reflected by the upstand mirror 5 is sent to the objective lens 6 to be focused on a recording surface 50a of the optical disc 50 by the objective lens 6.

The laser light which is focused on the recording surface 50a of the optical disc 50, is reflected by the recording surface 50a. The returned light which is reflected by the recording surface 50a, passes through the objective lens 6, and is reflected again by the upstand mirror 5. Then, the laser light passes through the collimator lens 4 and is reflected by the beam splitter 3 to be focused on a light receiving area (not shown) of the photo detector 7.

The photo detector 7 has a function to convert light information which is received in the light receiving area into electric signal. The electric signal which is output from the photo detector 7 is processed to a playback signal for reproducing information, and a focus error signal, a tracking error signal or the like that is used to perform focusing adjustment or tracking adjustment for the objective lens 6. Here, the term "focusing adjustment" means adjustment which is performed such that a position of focusing point of the objective lens 6 is always kept on the recording surface 50a of the optical disc 50. Further, the term "tracking adjustment" means adjustment which is performed such that a position of beam spot which is formed on the recording surface 50a is always kept on a track which is formed on the optical disc 50.

It should be noted that the objective lens 6 which is provided with the optical pickup 1, is held on the lens holder 22 (See, FIG. 1) and it is made movable in the focusing direction and the tracking direction by an objective lens actuator 20 whose detail will be explained later. By this arrangement, the above described focusing adjustment and the tracking adjustment can be performed.

Figure 3:
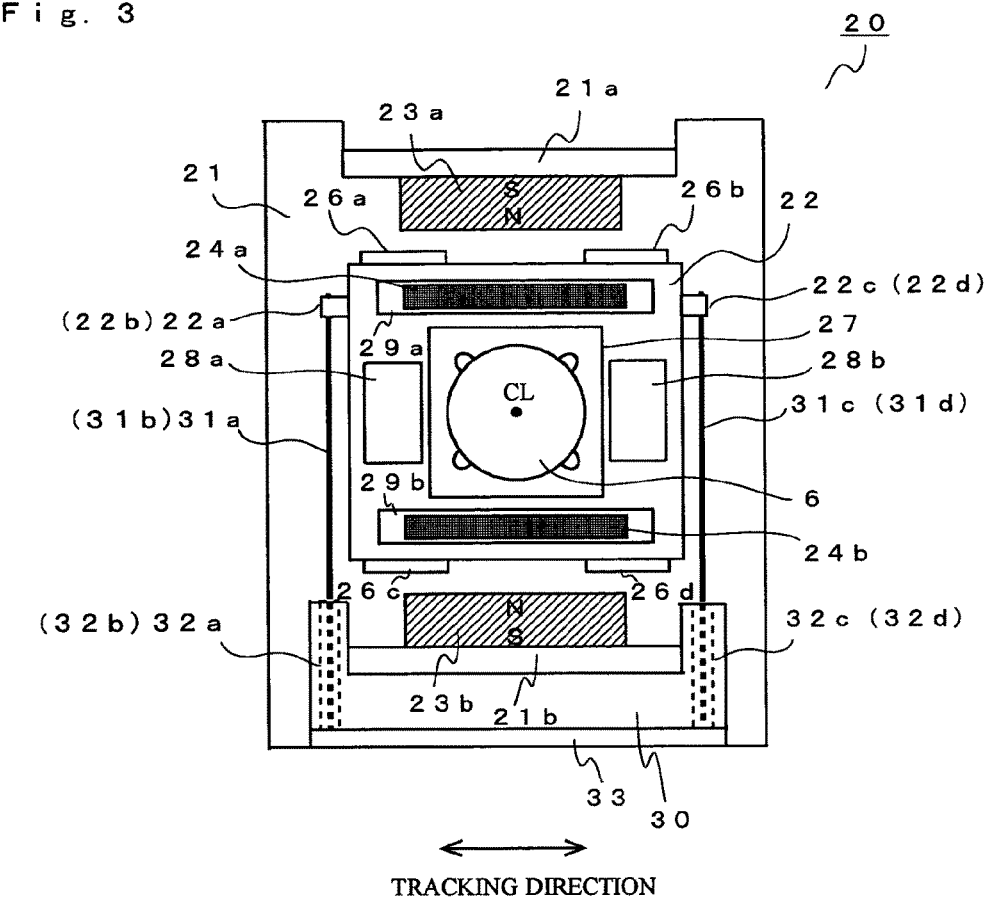
FIG. 3 is a schematic plan view to show structure of an objective lens actuator according to the present embodiment.
Figure 4:
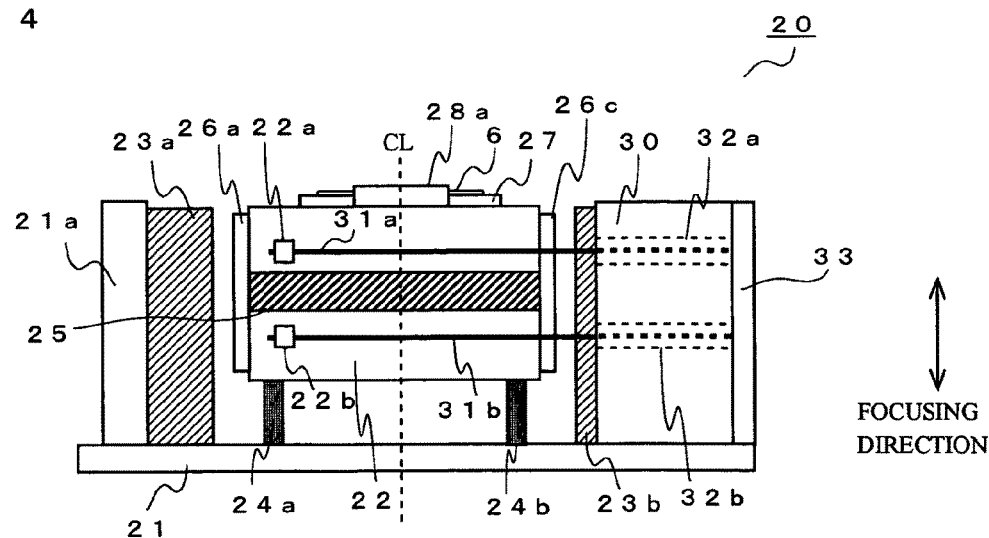
FIG. 4 is a schematic side view of the objective lens actuator shown in FIG. 3.

Next, explanation will be given about whole structure of the objective lens actuator 20 which is provided with the optical pickup according to the present embodiment with reference to FIG. 3 and FIG. 4. Here, FIG. 3 is a schematic plan view to show structure of the objective lens actuator 20 according to the present embodiment. Further, FIG. 4 is a schematic side view of the objective lens actuator 20 according to the present embodiment shown in FIG. 3.

The objective lens actuator 20 includes a base 21, the lens holder 22, permanent magnets 23a, 23b, yokes 24a, 24b, a focusing coil 25, tracking coils 26a-26d, protectors 28a, 28b, a gel holder 30, wires 31a-31d, and a circuit board 33.

The base 21 is made by metal which has ferromagnetism and it has a through hole (not shown) which is formed at substantially center of the base to pass the laser light. Then, the lens holder 22 whose detail will be explained later is arranged above the through hole. Further, on the base 21, a pair of permanent magnets 23a, 23b are arranged to stand and face each other with a prescribed distance to sandwich the lens holder 22.

The permanent magnets 23a, 23b are made of, for example, rare-earth magnet and are arranged such that the same magnetic poles of them are facing each other. In the present embodiment, the permanent magnets 23a, 23b are arranged such that their N poles are facing. Further, the permanent magnets 23a, 23b are in a state where their outer surfaces are attached by magnetic force onto protruding portions 21a, 21b which are formed by bending parts of the base 21.

In addition, a pair of yokes 24a, 24b are arranged to stand on the base 21 such that they are sandwiched between the permanent magnets 23a and 23b, and they are arranged to face each other in the same direction as the magnets 23a, 23b. These yokes 24a, 24b are formed by bending parts of the base 21. The yokes 24a, 24b draw effectively magnetic flux from the permanent magnets 23a, 23b, respectively, so that high density magnetic flux is mainly given to the focusing coil 25 and tracking coils 26a-26d that are disposed between the permanent magnets 23a, 23b, and will be described later. That is, the yokes 24a, 24b have a role to increase drive efficiency of the lens holder 22.

In the lens holder 22 a light path hole (not shown) is formed at center portion of the holder so as to pass the laser light. It should be noted that the light path hole is in a state where it extends in a direction that is perpendicular to surface of FIG. 3. In upper side of the light path hole an objective lens holding portion 27 is formed to hold the objective lens 6. It should be noted that the objective lens 6 which is held by the objective lens holding portion 27 is arranged such that its optical axis is parallel to a direction which is perpendicular to the surface of FIG. 3. Further, hollow portions 29a, 29b are formed on the lens holder 22 such that the above described yokes 24a, 24b can pass through the hollow portions.

The focusing coil 25 is provided on side wall of outer surface of the lens holder 22 so as to surround the optical axis of the objective lens 6 which is mounted on the lens holder 22, and the focusing coil is fixed to the lens holder 22 by adhesive agent or the like. In addition, in the side walls of the lens holder 22, a pair of the tracking coils 26a-26d are provided on right and left of outsides of both side walls which face to the permanent magnets 23a, 23b. The tracking coils are fixed on the lens holder 22 by adhesive agents or the like. It should be noted that each pair of the tracking coils formed on each side wall are provided in substantially symmetrical position with respect to the lens holder 22. Further, the four tracking coils 26a-26d are connected by one wire as a whole.

Further, two protectors 28a, 28b are provided on the lens holder 22 in order to prevent collision between the optical disc 50 and the objective lens 6. It should be noted that these two protectors 28a, 28b are arranged in positions which are substantially symmetrical with respect to a center line CL that is substantially parallel to the optical axis direction of the objective lens 6 and that passes substantially center of the lens holder 22. In the present embodiment, the center line CL is equal to the optical axis of the objective lens 6. Detail of the two protectors 28a, 28b will be explained later.

The gel holder 30 that is made by a resin molded article such as polycarbonate or the like is fixed to the outer surface side of the protruding portion 21b to which one of the permanent magnet 23b between the two permanent magnets 23a, 23b, is fixed magnetically on the base 21. Further, on the base 21, the circuit board 33 is arranged to stand adjacent to the gel holder 30.

Ends of wires 31a, 31b, 31c, and 31d which have electrical conductivity are connected by soldering at two positions in the vertical direction of both right and left sides of the circuit board 33. Each of these four wires 31a-31d passes through each of through holes 32a, 32b, 32c, and 32d which are formed in the gel holder 30 at positions corresponding to the connecting points of the circuit board 33, that is, at two positions in the vertical direction of both of the right and left sides.

The respective other ends of the wires 31a, 31c in upper side are fixed by soldering to wire supporting portions 22a, 22c which are provided on the lens holder 22. At this point, wires 31a, 31c are made in a state where they are electrically connected with the focusing coil 25. On the other hand, respective other ends of the wires 31b, 31d in lower side are fixed by soldering to the wire supporting portions 22b, 22d which are provided on the lens holder 22. At this point, wires 31b, 31d are made in a state where they are electrically connected with the tracking coils 26a-26d. By this arrangement, the lens holder 22 is supported by the respective wires 31a-31d in a swingable manner with respect to the base 21.

Each of the through holes 32a-32d of the gel holder 30, through which the respective wires 31a-31d pass, is filled with a gel material whose main material is silicone. At this point, the gel material is formed by irradiating ultraviolet rays for a predetermined period of time to low viscosity gel material (sol) that is injected into the respective through holes 32a-32d of the gel holder 30 so that the material is cured into a gel state. This gel holder 30 plays a role of absorbing and reducing vibration generated in the respective wires 31a-31d due to driving of the lens holder 22 by the gel material.

Brief explanation will be given about operation of the objective lens actuator 20 which is structured as above described. When current is supplied to the focusing coil 25 from the circuit board 33 via the wires 31a, 31c, it is made possible for the lens holder 22 to move in the focusing direction by an electromagnetic action in a magnetic field that is formed by a magnetic circuit including the base 21, the permanent magnets 23a, 23b, and the yokes 24a, 24b. As a result, adjustment of the objective lens 6 in the focusing direction (focusing adjustment) is made possible by adjusting intensity and the direction of the current to be supplied to the focusing coil 25.

Further, when current is supplied to the tracking coils 26a-26d from the circuit board 33 via the wires 31b, 31d, it is made possible for the lens holder 22 to move in the tracking direction by an electromagnetic action in the magnetic field that is formed by the magnetic circuit including the base 21, the permanent magnets 23a, 23b, and the yokes 24a, 24b. As a result, adjustment of the objective lens 6 in the tracking direction (tracking adjustment) is made possible by adjusting intensity and the direction of the current to be supplied to the tracking coils 26a-26d.

It should be noted that in the present embodiment structure is employed in that total four wires, two in both sides, are used to hold the lens holder 22. However, the present invention is not limited to this embodiment. It is no problem that structure is employed in that, for example, total six wires, three in both sides, are used to hold the lens holder 22. Further, in the present embodiment the lens holder 22 is made possible to move in the focusing direction and the tracking direction. However, it is no problem that structure is employed in that the lens holder 22 can be rotated in a direction around an axis which is perpendicular to both of the focusing direction and the tracking direction, for example. In such case, it is necessary to provide another coil (tilting coil) that is different from both of the focusing coil and the tracking coils which are described in the present embodiment. Further in such case, it becomes necessary to add structure for supplying current to the tilting coil. Supplying current to the tilting coil can be made possible by, for example, to increase number of the wires total six, three in both sides.

Figure 5:
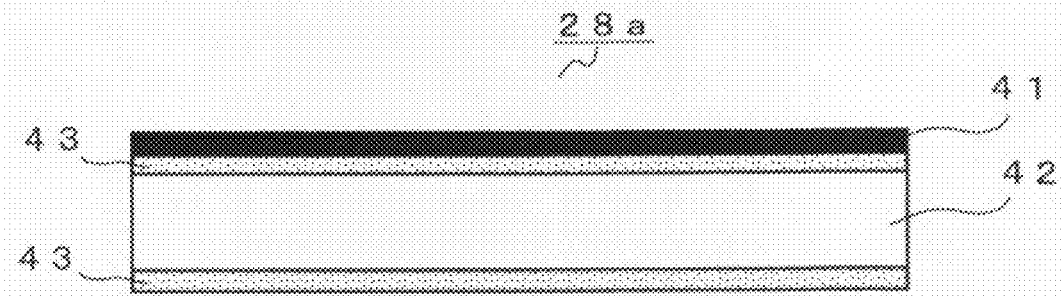
FIG. 5 is a schematic diagram to show structure of a protector which is provided with the optical pickup according to the present embodiment and is an enlarged view of the protector shown in FIG. 4.

Next, explanation will be given about the protectors 28a, 28b which are provided on the lens holder 22 to prevent the collision between the optical disc 50 and the objective lens 6 with reference to FIG. 5. It should be noted that FIG. 5 is a schematic diagram to show structure of the protectors 28a, 28b which are included in the optical pickup according to the present embodiment, and is an enlarged view of the protector 28a that is shown in FIG. 4. It should be noted that, in the present embodiment two protectors 28a, 28b are provided to prevent the collision between the optical disc 50 and the objective lens 6, and structure of the two protectors 28a, 28b is the same.

As shown in FIG. 5, the protectors 28a, 28b which are included in the optical pickup 1, are structured by laminating a plurality of sheets 41-43. That is, the protectors 28a, 28b are structured by laminating a first sheet material 41, an adhesive sheet 43, a second sheet material 42, and the adhesive sheet 43 in this order from upper layer. Then, total thickness (height) of the protector 28a or 28b is formed such that the uppermost portion of it becomes higher that the uppermost portion of the objective lens 6 which is held by the objective lens holding portion 27 (See, FIG. 4). By this arrangement, the protectors 28a, 28b prevent the collision between the optical disc 50 and the objective lens 6.

The first sheet material 41 is required that it is hard to give damage surface of the optical disc 50 when the collision occurs because there is a case where the material collides directly with the optical disc 50 that rotates in high speed. At this point, the optical disc 50 has structure to protect the recording surface 50a by transparent resin 50b (See, FIG. 2) in order to prevent damage of the recording surface 50a. That is, surface of the optical disc 50 is formed by the transparent resin 50b (it is formed of, for example, polycarbonate) as a protecting member. To attain this purpose the first sheet material 41 is required to be structured by a member which is hard to damage the transparent resin 50b that is the protecting member when the collision with the optical disc 50 occurs, that is, a member which is softer than the transparent resin 50b.

Further, if the first sheet material 41 collides with the optical disc 50 which rotates in high speed and the first sheet material 41 is scraped at the time, there may be a case where the scrape adheres to the optical disc 50. In such case, for example, when information that is recorded in the optical disc 50 is read out, reproduced signal is made deteriorated, and a situation is introduced that the reproduction of information cannot be performed, in worst case, because the stain is generated on surface of the optical disc 50. As a result, it is required that the first sheet material 41 is structured by a member which has durability for abrasion so that it does not generate the scrape or it does hardly generate the scrape even when the first sheet material 41 collides with the optical disc 50 which rotates in high speed. This means a state where generation of the scrape is restrained in a level that the above described deterioration of the reproduced signal does not become an issue.

As for the material that fulfills the above described demand, for example, any one of polyester filament, ultra high molecular weight polyethylene (UHMW-PE), and polyacetal (POM) is selected as the sheet material for the first sheet material 41 in the present embodiment. However, as for the material that forms the first sheet material 41, there is no need to be limited to them. As for the material of the first sheet material 41 any other material can be used as far as it has durability for abrasion against the collision with the optical disc 50 which rotates in high speed and it is softer than the protecting member (transparent resin 50b) which protects the recording surface 50a of the optical disc 50.

The second sheet material 42 is formed by a member which has elasticity. In case where the protector to prevent the collision between the optical disc 50 and the objective lens 6 is formed by means that the first sheet material 41 is simply adhered on the lens holder 22, it cannot be said that they have enough function as the protector because there still remains possibility that the scratch or the stain is generated on the optical disc 50 when the protector is collided with the optical disc 50. As a result, in the protectors 28a, 28b that are included in the optical pickup 1 according to the present embodiment, structure is employed in which the second sheet material 42 is provided lower side of the first sheet material 41 such that the second sheet material 42 alleviates impact force when the optical disc 50 and the first sheet material 41 collide with each other.

In the present embodiment, as a material which composes the second sheet material 42, urethane resin is selected. However, the present invention is not intended to be limited only to the material, it is no problem that any other sheet material which is different from the urethane resin material is selected as far as the sheet material has elasticity.

The adhesive sheet 43 is a sheet which has adhesiveness in both sides. As for this kind of sheet, for example, double stick tape can be used. Then, in the present embodiment, the adhesive sheet 43 is arranged between the first sheet material 41 and the second sheet material 42 to adhere the first sheet material 41 and the second sheet material 42. Further, the adhesive sheet 43 is arranged between the second sheet material 42 and upper surface of the lens holder 22 to adhere the second sheet material 42 and the lens holder 22. Then, by this arrangement, the protectors 28a, 28b are attached to the lens holder 22.

In case where the protectors 28a, 28b which prevent the collision between the optical disc 50 and the objective lens 6, are structured as above described, it becomes hard for the scratch or the stain to be generated on the optical disc 50 even when the protectors 28a, 28b collide with the optical disc 50 because it has impact force alleviating effect by the second sheet material 42 in addition to the function that the material which composes the first sheet material 41 has.

Further, because the protectors 28a, 28b according to the present embodiment have structure of laminating sheets, dimensional control of the protector can be performed easily and load for working operation for providing the protectors 28a, 28b is maintained low. Further, because the protectors 28a, 28b according to the present embodiment can be formed by resin sheets which are available easily, it is possible to provide the protectors 28a, 28b in low cost.

The embodiment shown above is mere an example, and the optical pickup in accordance with the present invention is not limited to the above described embodiment. It is possible to introduce various alterations to the present invention within a range that does not depart from object of the present invention.

In the present embodiment, for example, structure is employed in which two protectors 28a, 28b are provided on the lens holder 22. However, number of the protector which is provided on the lens holder 22 is not limited to this.

Further, as for the position where the two protectors 28a, 28b are provided on the lens holder 22, it is not limited to the position that is described in the present embodiment. However, it is preferable that even numbers of the protectors (two in the present embodiment) are provided on the lens holder 22, and each protector is arranged such that each protector has substantially symmetrical positional relation with one of the protectors with regard to a center line CL which passes substantially center of the lens holder 22 as in the present embodiment. By structuring the protector as above described, possibility of the collision between the optical disc 50 and the objective lens 6 can be reduced.

Further, as for the position where the protectors 28a, 28b to prevent the collision between the optical disc 50 and the objective lens 6 are provided, it is not limited to the position on the lens holder 22, it is no problem that structure is employed in that the protectors are provided on the objective lens 6. However, fixing of the protectors 28a, 28b can be performed easily in structure in that the protectors 28a, 28b are provided on the lens holder 22 as in the present embodiment.

Further, in the present embodiment, structure is employed in that the protectors 28a, 28b are composed of the first sheet material 41, the second sheet material 42, and the adhesive sheet 43. However, the present invention is not limited to the structure, and it is no problem that structure is employed in that at least one of other sheet material than these sheet materials is added as the sheet material which composes the protectors 28a, 28b. However, even in this case, it is necessary that the first sheet material 41 is arranged as the uppermost layer and the second sheet material 42 is arranged in lower side than the first sheet material 41.

Figure 6:
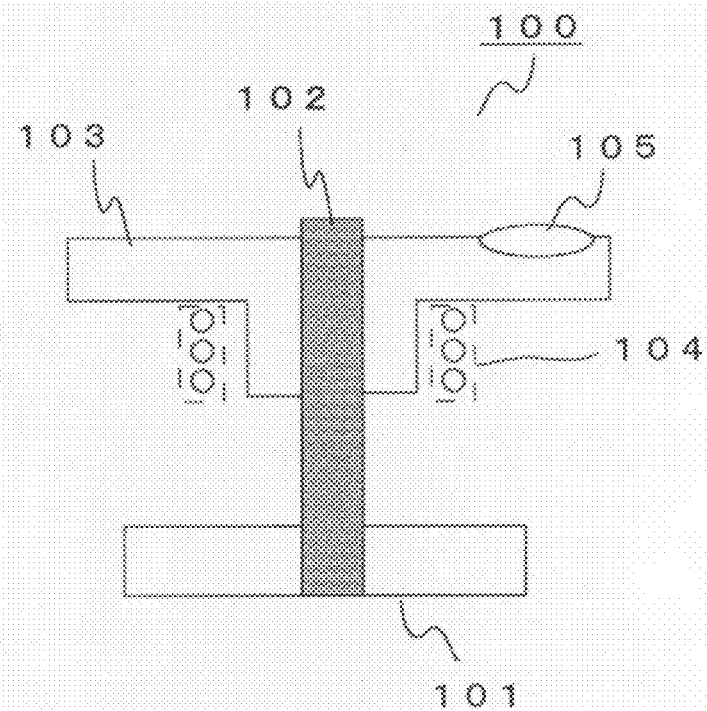
FIG. 6 is a diagram to show another embodiment of the objective lens actuator that is provided with the optical pickup to which the present invention is applied.

Further, in the present embodiment structure is employed in that the lens holder 22 is supported by the wires and the lens holder 22 is moved by the swing of the wires (objective lens actuator in a wire supporting method) as the structure for the objective lens actuator 20. However, structure for the objective lens actuator is not limited to this structure. For example, it is no problem that structure is employed in which the objective lens actuator 100 of so called a shaft sliding type is used as shown in FIG. 6. Even in this case, same effect as in a case of the present embodiment can be obtained by employing structure in that the protector is structured as shown in FIG. 5.

It should be noted that the objective lens actuator 100 shown in FIG. 6 is provided with a base 101, a sliding shaft 102, a lens holder 103 which holds a objective lens 105, and a focusing coil 104. Then, in the objective lens actuator 100, the lens holder 103 is slid along the sliding shaft 102 by force which is generated in a parallel direction to the longer direction of the sliding shaft 102 by the electromagnetic action between magnetic field of permanent magnet that is not shown in the drawing and current that flows in the focusing coil.

Further, in the present embodiment, the optical pickup that can be applied to one kind of the optical disc is described. However, the present invention can be applied to an optical pickup which is applied to a plurality of kinds of optical discs (such kind of the optical pickup includes a lens holder on which a plurality of objective lenses are mounted), of course.

By the optical pickup in accordance with the present invention, the collision between the objective lens and the optical recording medium can be prevented by the protector. Further, the possibility of occurrence of the scratch or the stain on the optical recording medium can be maintained low even when the protector and the optical recording medium collide with each other. Further, such protector can be formed in low cost and in addition, at low load for working operation. As a result, the present invention is very useful for an optical pickup which has structure that can prevent the collision between an objective lens and an optical disc.

What is claimed is:

1. An optical pickup comprising:
a light source;
an objective lens which focuses light that is emitted from the light source on a recording surface of an optical recording medium;
a lens holder which holds the objective lens; and
a protector which is formed on the lens holder or the objective lens to prevent collision between the objective lens and the optical recording medium, wherein
the protector is formed by laminating a plurality of sheets without a coating layer provided on an uppermost layer, and
the protector includes:
a first sheet material which is arranged on the uppermost layer, has durability for abrasion against the collision with the optical recording medium that rotates in high speed, and is softer than a protecting member that protects the recording surface of the optical recording medium;
a second sheet material which is provided in lower side than the first sheet material and has elasticity; and
a plurality of adhesive sheets to perform adhesion between the sheet materials that form the protector, or adhesion between the lowermost sheet material among the sheet materials and the lens holder, or the objective lens.

2. The optical pickup according to claim 1, wherein the protector is formed of the first sheet material, the adhesive sheet, the second sheet material, and the adhesive sheet in this order from upper layer to lower layer.

3. The optical pickup according to claim 2, wherein the first sheet material is made of any one of polyester filament, ultra high molecular weight polyethylene, and polyacetal.

4. The optical pickup according to claim 3, wherein the second sheet material is made of urethane resin.

5. The optical pickup according to claim 4, wherein even numbers of the protectors are formed on the lens holder, and each protector is arranged such that each protector has substantially symmetrical positional relation with one of the protectors with regard to a center line which is substantially parallel to an optical axis direction of the objective lens and passes substantially center of the lens holder.

6. The optical pickup according to claim 3, wherein even numbers of the protectors are formed on the lens holder, and each protector is arranged such that each protector has substantially symmetrical positional relation with one of the protectors with regard to a center line which is substantially parallel to an optical axis direction of the objective lens and passes substantially center of the lens holder.

7. The optical pickup according to claim 2, wherein the second sheet material is made of urethane resin.

8. The optical pickup according to claim 2, wherein even numbers of the protectors are formed on the lens holder, and each protector is arranged such that each protector has substantially symmetrical positional relation with one of the protectors with regard to a center line which is substantially parallel to an optical axis direction of the objective lens and passes substantially center of the lens holder.

9. The optical pickup according to claim 1, wherein the first sheet material is made of any one of polyester filament, ultra high molecular weight polyethylene, and polyacetal.

10. The optical pickup according to claim 9, wherein the second sheet material is made of urethane resin.

11. The optical pickup according to claim 10, wherein even numbers of the protectors are formed on the lens holder, and each protector is arranged such that each protector has substantially symmetrical positional relation with one of the protectors with regard to a center line which is substantially parallel to an optical axis direction of the objective lens and passes substantially center of the lens holder.

12. The optical pickup according to claim 9, wherein even numbers of the protectors are formed on the lens holder, and each protector is arranged such that each protector has substantially symmetrical positional relation with one of the protectors with regard to a center line which is substantially parallel to an optical axis direction of the objective lens and passes substantially center of the lens holder.

13. The optical pickup according to claim 1, wherein the second sheet material is made of urethane resin.

14. The optical pickup according to claim 13, wherein even numbers of the protectors are formed on the lens holder, and each protectors is arranged such that each protector has substantially symmetrical positional relation with one of the protectors with regard to a center line which is substantially parallel to an optical axis direction of the objective lens and passes substantially center of the lens holder.

15. The optical pickup according to claim 1, wherein even numbers of the protectors are formed on the lens holder, and each protector is arranged such that each protector has substantially symmetrical positional relation with one of the protectors with regard to a center line which is substantially parallel to an optical axis direction of the objective lens and passes substantially center of the lens holder.

* * * * *